July 10, 1962  R. C. AKERS  3,044,007
PROGRAMMABLE POWER SUPPLY
Filed April 10, 1958  2 Sheets-Sheet 2

INVENTOR.
ROBERT C. AKERS
BY Louis J. Knobbe
AGENT

United States Patent Office 3,044,007
Patented July 10, 1962

3,044,007
PROGRAMMABLE POWER SUPPLY
Robert C. Akers, Long Beach, Calif., assignor to
North American Aviation, Inc.
Filed Apr. 10, 1958, Ser. No. 727,703
6 Claims. (Cl. 323—22)

This invention relates to power supplies, and more particularly to power supplies having an output voltage programmed in response to a binary coded signal input.

Although the present invention has general application, it is particularly adapted for use in an automatic checkout system. In this type of system a sequence of tests are programmed in a memory storage element. Magnetic or punched paper tape are commonly utilized for this purpose. Often times, the testing of a circuit, component, or system requires that the circuit etc. be tested while energized by one or more precision voltages. The magnitudes of voltages required will often vary for different stages of a single test, and of course, for various components. The present invention provides a programmable power supply having an output voltage under the control of a binary coded signal. The required testing analog voltages may thus be obtained in accordance with digital binary signals recorded in the memory storage element.

Accordingly, it is an object of this invention to provide an improved programmable power supply.

It is another object of this invention to provide a power supply whose output voltage is under the control of a binary coded signal.

It is still another object of this invention to provide a programmable power supply adapted for a plurality of binary coding arrangements.

A further object of this invention is to provide an improved digital-to-analog converter.

Other and further objects, features and advantages of the invention will become apparent as the description proceeds.

The present invention accomplishes the above cited objects by providing a power supply whose output varies linearly with a change in resistance in the voltage regulation circuitry. A resistor network programmable according to a predetermined number system is utilized to vary this resistance thereby controlling the power supply output voltage in response to digital input signals.

Figure 1:
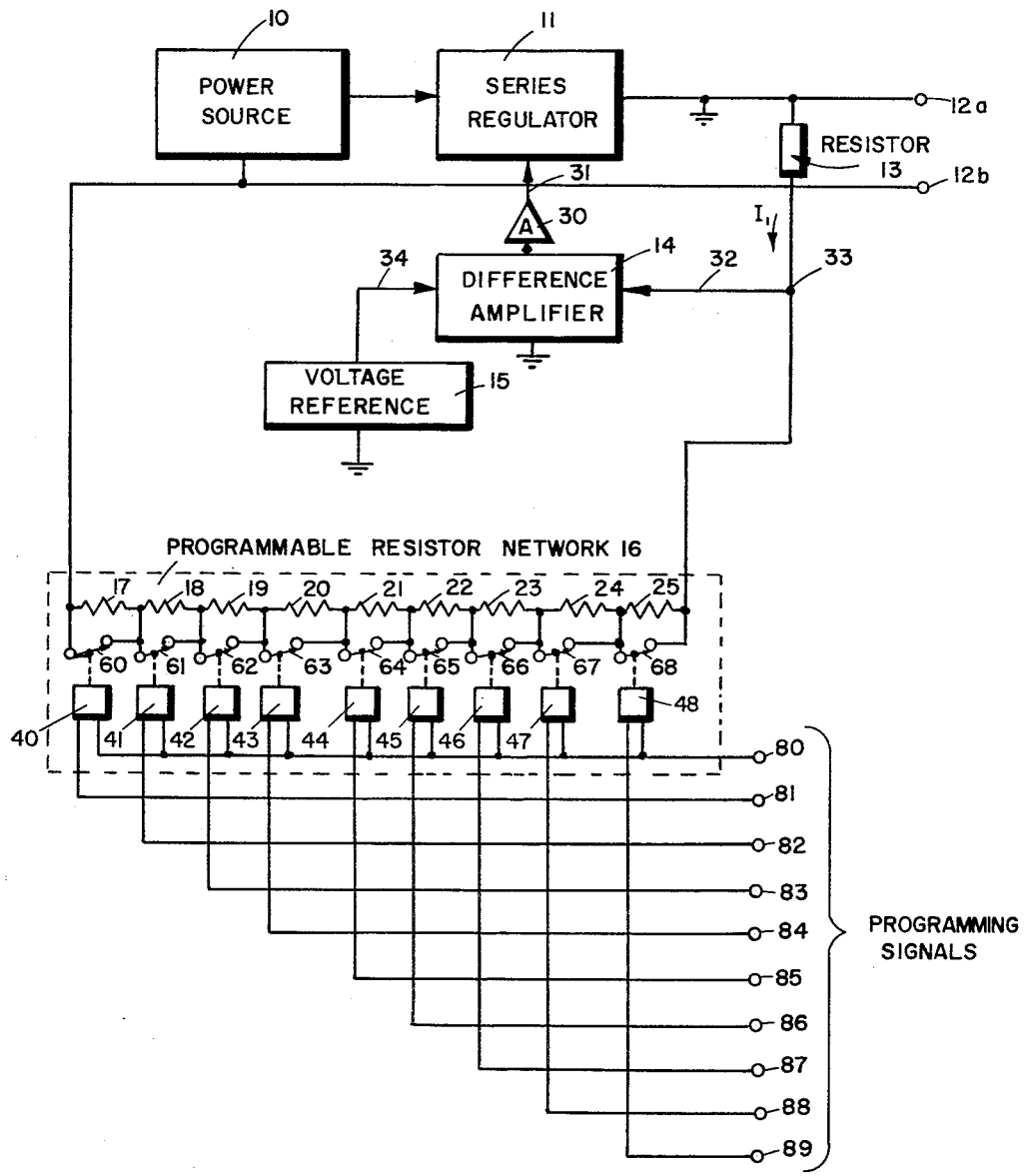
Figure 2:
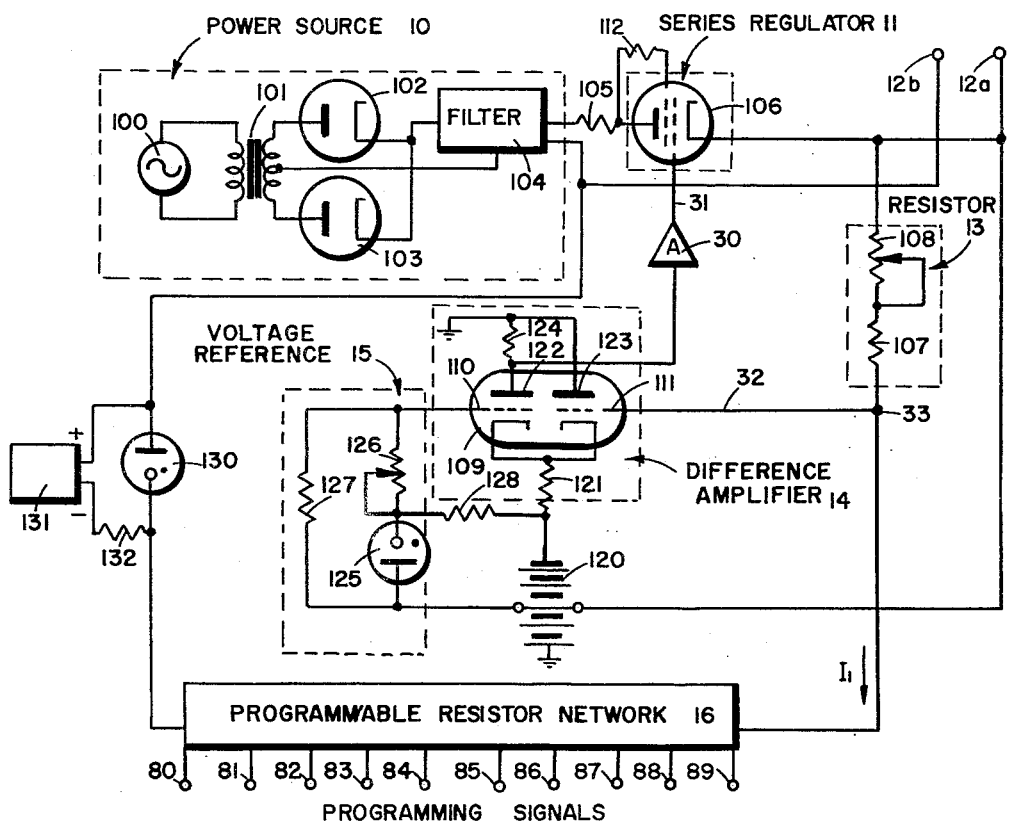

A more thorough understanding of the invention may be obtained by a study of the following detailed description taken in connection with the accompanying drawings in which:

FIG. 1 illustrates a programmable power supply constructed in accordance with this invention; and FIG. 2 illustrates schematically the programmable power supply shown in FIG. 1.

Referring now to FIG. 1, a power source 10 is connected to drive output terminals 12a and 12b. Series regulator 11 is connected between an output of power source 10 and output terminal 12a. The voltage potential between the input and output of series regulator 11 varies with a change in the signal on line 31. The voltage between the output terminals 12a and 12b is dependent upon the voltages at the terminals of power source 10 and across the series regulator 11. Therefore, assuming that the output voltage of power source 10 is a constant, the voltage between the output terminals 12a and 12b will vary as the signal on line 31 varies.

Feedback resistor 13, connected to the output of series regulator 11, is utilized to effect a feedback signal according to the voltage across said output terminals thereby achieving voltage regulation. As shown, resistor 13 and programmable resistor network 16 are connected in series across the potential existing between the output terminals 12a and 12b. One input to difference amplifier 14 appears on line 32 as the voltage drop across resistor 13. Another input to difference amplifier 14 appears on line 34 as the fixed potential output of voltage reference 15. Difference amplifier 14 may be any circuitry which has for its output the difference between the voltages appearing on lines 34 and 32. Therefore, the input to amplifier 30 is the difference between the output of voltage reference 15 and the voltage across resistor 13. A feedback loop is completed by connecting the output of amplifier 30 to series regulator 11 by line 31 to effect control of the voltage drop across the regulator and thus control the output at terminals 12a, 12b.

The circuitry heretofore described operates to achieve voltage regulation as follows: Current $I_1$ shown in FIG. 1 is caused to flow through series connected feedback resistor 13 and programmable resistor network 16 whenever a voltage potential exists between output terminal 12a and 12b. The voltage potential on line 32 is the voltage drop across resistor 13 due to the flow of current $I_1$. The potential existing on line 34 is a constant determined by voltage reference 15. Whenever the potentials on line 32 and 34 are unequal, an error signal supplied by difference amplifier 14 will be amplified in amplifier 30 and will effect a change in the voltage drop across series regulator 11. The voltage at the output terminals 12a and 12b will thus be driven to a value such that the current $I_1$ flowing through resistor 13 will cause a voltage drop across resistor 13 equal in magnitude to the voltage output of voltage reference 15. The value of current $I_1$ will remain at the value determined by voltage reference 15 and resistor 13 until such time as there is a variation in the voltage between output terminals 12a and 12b. For example, a change in potential between these terminals would be caused by a change in the voltage of power source 10. Any change in output potential will cause a variation in the flow of current $I_1$ so as to reflect a different potential at junction 33. Since the potential on line 32 is no longer the same as the potential on line 34, the difference amplifier will respond so as to supply an error signal output which drives amplifier 30. The amplifier error signal in line 31 affects the potential across series regulator 11 in such a way as to produce a change in voltage drop across regulator 11 that opposes the change in output voltage.

Difference amplifier 14 and the circuitry associated therewith also provide a means of selecting a range of output potentials. As noted above, the potential between terminals 12a and 12b will tend to remain at a predetermined value so as to equate the voltage drop across resistor 13 with that of voltage reference 15. If, however, the resistance of programmable resistor network 16 is changed, the value of current $I_1$ will also tend to change in an inverse manner. As in the case of voltage regulation, a change in the value of current $I_1$ will immediately cause a change in the voltage across resistor 13 thereby unbalancing the inputs to difference amplifier 14. Series regulator 11 produces a change in voltage at terminals 12a–12b so as to drive the current $I_1$ to its original value, thereby equating the voltages on lines 32 and 34. Thus, the voltage at the output terminals 12a–12b may be controlled by varying the resistance of programmable resistor network 16. By suitably selecting the cicuit parameters, and in particular selecting an amplifier 30 having a high gain, the output voltage may be made to vary linearly with a change in resistance of programmable resistor network 16.

Programmable resistor network 16 includes a plurality of series connected resistors 17, 18, 19, 20, 21, 22, 23, 24 and 25. Relays 40, 41, 42, 43, 44, 45, 46, 47 and 48 have respective contact pairs 60, 61, 62, 63, 64, 65, 66, 67 and 68. Each of these contact pairs are connected to opposite sides of a different one of the resistors 17 through 25. Terminal 80 is connected to a connecting line common to all of the relays 40 to 48. Terminals 81, 82, 83, 84, 85, 86, 87, 88 and 89 are each respectively connected to one of the relays 40 to 48. Thus, if a programming signal is applied between terminal 80 and any one of the terminals 81 through 89, the respective relay will be actuated thereby effecting an operation of the associated contact. The contacts 60 through 68 are normally closed contacts as illustrated in FIG. 1. The associated resistors are thereby shunted whenever a programming signal is absent. Therefore, if no programming signals are present, the resistance of programmable resistor network 16 is zero ohm. Contrariwise, if a programming signal is present between terminal 80 and each of the terminals 81 through 89, the resistance of programmable resistance network 16 is a mixamum resistance equal to the sum of each of the individual resistors 17 through 25.

Resistors 17 through 25 are assigned values according to a predetermined number system. An example of one such system is an ordinary binary code (tabulated in Table 1). The values assigned to resistors 17 through 25 are those which would be utilized in a power supply whose output voltage is equal to one volt per thousand ohm change in resistance of the programmable resistor network 16. So long as the power supply output is linear with a change in resistance in the programmable resistor network 16, the actual ratio of resistance change to output voltage change is immaterial and the values of resistances 17 through 25 would be changed accordingly, i.e., if the output voltage were equal to one volt per hundred ohm change, the value of each of the resistors 17 through 25 would be divided by 10.

*Table 1*

ORDINARY BINARY

| Resistor No. | Value, ohms | Output Voltage, volts |
|---|---|---|
| 17 | 1K | 1 |
| 18 | 2K | 2 |
| 19 | 4K | 4 |
| 20 | 8K | 8 |
| 21 | 16K | 16 |
| 22 | 32K | 32 |
| 23 | 64K | 64 |
| 24 | 128K | 128 |
| 25 | 256K | 256 |

Table 2 illustrates the programming signals required for output voltages in the range of zero to ten volts for an ordinary binary code. In this, and subsequent tables, a zero indicates the absence of a programming signal and a "1" indicates the presence of a programming signal. The table could, of course, be enlarged in a similar manner so as to produce any decimal voltage between zero and 511 volts depending upon the programming signals applied to terminals 81 through 89.

*Table 2*

| Decimal Voltage, volts | Programming Signals—Ordinary Binary |||||||||
|---|---|---|---|---|---|---|---|---|---|
| | 89 | 88 | 87 | 86 | 85 | 84 | 83 | 82 | 81 |
| 0 | 0 | 0 | 0 | 0 | 0 | 0 | 0 | 0 | 0 |
| 1 | 0 | 0 | 0 | 0 | 0 | 0 | 0 | 0 | 1 |
| 2 | 0 | 0 | 0 | 0 | 0 | 0 | 0 | 1 | 0 |
| 3 | 0 | 0 | 0 | 0 | 0 | 0 | 0 | 1 | 1 |
| 4 | 0 | 0 | 0 | 0 | 0 | 0 | 1 | 0 | 0 |
| 5 | 0 | 0 | 0 | 0 | 0 | 0 | 1 | 0 | 1 |
| 6 | 0 | 0 | 0 | 0 | 0 | 0 | 1 | 1 | 0 |
| 7 | 0 | 0 | 0 | 0 | 0 | 0 | 1 | 1 | 1 |
| 8 | 0 | 0 | 0 | 0 | 0 | 1 | 0 | 0 | 0 |
| 9 | 0 | 0 | 0 | 0 | 0 | 1 | 0 | 0 | 1 |
| 10 | 0 | 0 | 0 | 0 | 0 | 1 | 0 | 1 | 0 |

Often times it is desirable that each decimal digit be coded in binary. There are many ways of "coding" the decimal digits, i.e., of combining several binary digits to represent one decimal digit. All of the binary coded decimal systems require at least four bits, and involve assigning some value to each. Two systems in common use are the 8-4-2-1 and the 2-4-2-1 systems. The 8-4-2-1 system assigns the same weights to the bits as in ordinary binary notation shown in Tables 1 and 2. The values of resistances 17 to 25 coded for this system are recorded in Table 3. Table 4 tabulates the programming signals required for producing the decimal voltages from zero to ten volts. Table 4 could be enlarged in like manner to include a range of 0 to 199 volts.

*Table 3*

BINARY CODED DECIMAL (8-4-2-1)

| Resistor No. | Value, ohms | Output Voltage, volts |
|---|---|---|
| 17 | 1K | 1 |
| 18 | 2K | 2 |
| 19 | 4K | 4 |
| 20 | 8K | 8 |
| 21 | 10K | 10 |
| 22 | 20K | 20 |
| 23 | 40K | 40 |
| 24 | 80K | 80 |
| 25 | 100K | 100 |

*Table 4*

| Decimal Voltage, volts | Programming Signals—(BCD, 8-4-2-1) |||||||||
|---|---|---|---|---|---|---|---|---|---|
| | 89 | 88 | 87 | 86 | 85 | 84 | 83 | 82 | 81 |
| 0 | 0 | 0 | 0 | 0 | 0 | 0 | 0 | 0 | 0 |
| 1 | 0 | 0 | 0 | 0 | 0 | 0 | 0 | 0 | 1 |
| 2 | 0 | 0 | 0 | 0 | 0 | 0 | 0 | 1 | 0 |
| 3 | 0 | 0 | 0 | 0 | 0 | 0 | 0 | 1 | 1 |
| 4 | 0 | 0 | 0 | 0 | 0 | 0 | 1 | 0 | 0 |
| 5 | 0 | 0 | 0 | 0 | 0 | 0 | 1 | 0 | 1 |
| 6 | 0 | 0 | 0 | 0 | 0 | 0 | 1 | 1 | 0 |
| 7 | 0 | 0 | 0 | 0 | 0 | 0 | 1 | 1 | 1 |
| 8 | 0 | 0 | 0 | 0 | 0 | 1 | 0 | 0 | 0 |
| 9 | 0 | 0 | 0 | 0 | 0 | 1 | 0 | 0 | 1 |
| 10 | 0 | 0 | 0 | 0 | 1 | 0 | 0 | 0 | 0 |

The 2-4-2-1 or modified binary coded decimal system has several features which may be desirable in digitally controlled equipment. This system has the following two characteristics: (1) The nine's complement of a decimal digit can be formed by complementing each binary digit. (2) When any two binary coded digits are added in binary, the sum always contains five binary digits if it is ten or greater and four binary digits if it is less than ten. The value to be assigned the resistors in the programmable resistive network 16 are tabulated in Table 5 for this system. Table 6 illustrates the programming signals required for obtaining the decimal voltages from zero to ten volts. Table 6 could be enlarged in like manner to include a range of 9 to 199 volts.

*Table 5*

MODIFIED BINARY CODED DECIMAL (2-4-2-1)

| Resistor # | Value, ohms | Output Voltage, volts |
|---|---|---|
| 17 | 1K | 1 |
| 18 | 2K | 2 |
| 19 | 4K | 4 |
| 20 | 2K | 2 |
| 21 | 10K | 10 |
| 22 | 20K | 20 |
| 23 | 40K | 40 |
| 24 | 20K | 20 |
| 25 | 100K | 100 |

Table 6

| Decimal Voltage, volts | Programming Signals—(BCD, 2-4-2-1) | | | | | | | | |
|---|---|---|---|---|---|---|---|---|---|
| | 89 | 88 | 87 | 86 | 85 | 84 | 83 | 82 | 81 |
| 0 | 0 | 0 | 0 | 0 | 0 | 0 | 0 | 0 | 0 |
| 1 | 0 | 0 | 0 | 0 | 0 | 0 | 0 | 0 | 1 |
| 2 | 0 | 0 | 0 | 0 | 0 | 0 | 0 | 1 | 0 |
| 3 | 0 | 0 | 0 | 0 | 0 | 0 | 0 | 1 | 1 |
| 4 | 0 | 0 | 0 | 0 | 0 | 0 | 1 | 0 | 0 |
| 5 | 0 | 0 | 0 | 0 | 0 | 1 | 0 | 1 | 1 |
| 6 | 0 | 0 | 0 | 0 | 0 | 1 | 1 | 0 | 0 |
| 7 | 0 | 0 | 0 | 0 | 0 | 1 | 1 | 0 | 1 |
| 8 | 0 | 0 | 0 | 0 | 0 | 1 | 1 | 1 | 0 |
| 9 | 0 | 0 | 0 | 0 | 0 | 1 | 1 | 1 | 1 |
| 10 | 0 | 0 | 0 | 0 | 1 | 0 | 0 | 0 | 0 |

The two characteristics of the 2-4-2-1 system mentioned above may be checked by referring to Table 6. Thus, the nine's complement of five is four; the representations are respectively 1011 and 0100, which are seen to have binary zeros and ones reversed. Also, adding five and four in decimal causes no carry; adding 1011 and 0100 does not. Adding five and five does; adding 1011 and 1011 does.

The programming signals applied to terminals 80 through 89 may be conveniently recorded on any one of many memory elements. For example, punched paper tape or paper cards or magnetic tape or drums are all adaptable for storing the digital programming signals. The coding system selected may be one of those described above or some other binary scheme known in the art. In effect, the programmable power supply described above effects a digital-to-analog conversion. The digital information is applied as programming signals and the output of the power supply is a direct representation of the physical quantity desired (rather than representations of intermediate symbols applied as programming signals), i.e., an analog output.

FIG. 2 illustrates schematically, circuitry which may be utilized to construct the programmable power supply shown in FIG. 1. Power source 10 comprises a direct current source of conventional design. Alternating current source 100 energizes a full wave rectification circuit including center tapped transformer 101 and diodes 102 and 103. The output of this full wave circuit is connected to filter 104 which produces a reduced ripple factor. The output of filter 104 is coupled to the plate of tetrode 106 via resistor 105. The screen grid of this tube is biased by connecting it to the plate via resistor 112. The cathode of tetrode 106 is connected directly to output terminal 12a. Output terminal 12b is connected directly to the output of filter 104.

Feedback resistor 13 comprises series connected resistor 107 and variable resistor 108. Resistor 13 is connected between junction 33 and terminal 12a. Difference amplifier 14 includes a dual triode 109 having grids 110 and 111. Grid 111 is connected to junction 33 via connecting line 32. Grid 110 is connected to the output of voltage reference 15. The cathodes of dual triode 109 are connected together and to the negative side of battery 120 through biasing and coupling resistor 121. Plate 123 is connected directly to ground while plate 122 is connected to ground through resistor 124. The plate voltage supply for the dual triode 109 is completed by connecting the positive terminal of battery 120 to ground as illustrated.

The output of difference amplifier 14 is taken from the plate 122 which is connected directly to the input of amplifier 30. Amplifier 30 is a circuit of sufficient gain so as to make the output voltage between terminals 12a and 12b vary linearly with a change in resistance of programmable resistor network 16.

Voltage reference 15 includes a constant voltage tube 125 in series with a variable resistor 126. In parallel with these two components is resistor 127. A cold-cathode gaseous discharge tube known in the art as a "glow tube" is commonly used as constant voltage tube 125. This tube is characterized by having a constant voltage between its terminals over a considerable range of current flow through the tube. In order to supply the breakdown voltage for the tube, constant voltage tube 125 is connected between a midpoint of battery 120 and the negative terminal thereof. Resistor 128 is connected between the cathode of tube 125 and the negative terminal of battery 120.

The circuitry of programmable resistor network 16 is shown in block diagram form in FIG. 2 since it was shown in detail in FIG. 1. In the circuit shown in FIG. 2 it has been found convenient to include a second constant voltage tube 130 in series between programmable resistor network 16 and output terminal 12b. Direct current power supply 131 is connected across the constant voltage tube 130 through resistor 132 to supply the breakdown voltage for the tube. It has further been found convenient to operate the terminal 12a at a voltage below ground. Output terminal 12a is therefore connected to the midpoint of battery 120. This, of course, does not affect the output voltages of the power supply since they are measured between terminals 12a and 12b.

The addition of constant voltage tube 130 in the circuit permits the current $I_1$ to flow at its predetermined value when zero voltage is required between the output terminals 12a and 12b. Were this voltage source not included, any current flow through resistor 13 would produce a voltage drop seen between output terminals 12a and 12b. With the constant voltage tube 130 in circuit, the voltage drop across this tube exactly balances the voltage drop across resistor 13 in the zero voltage output condition, thereby permitting the predetermined current flow through the resistor 13 at this time.

In the operation of the circuit shown in FIG. 2, programming signals are applied so as to obtain a zero voltage output across terminals 12a and 12b. Normally, in this condition none of the relays 40 through 48 are actuated (FIG. 1). The resistance of programmable resistor network 16 in this condition is, of course, zero ohms. Variable resistor 126 in the voltage reference 15 is now changed so as to obtain zero voltage between terminals 12a and 12b. This adjustment provides a convenient means for correcting any unbalance between the triodes of dual triode 109. A further adjustment is provided by variable resistor 108 in the maximum voltage output condition. In this condition programming signals are acquired so as to normally operate all of the relays 40 through 48 thereby maximizing the resistive impedance of network 16 (FIG. 1). The resistance of variable resistor 108 is now changed so as to obtain the predetermined voltage at the output terminals 12a and 12b. With these adjustments having been made, the programmable power supply will deliver any voltage between zero and the maximum depending upon the digital signals applied to the programmable resistor network.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a source of direct voltage having first and second output terminals; a third output terminal; a series regulator connected between said first and third output terminals and having an input electrode for controlling the impedance of said regulator; a difference amplifier having an output terminal coupled with said regulator input terminal, a common terminal connected to said third output terminal, and a pair of input terminals; a voltage reference connected between said third output terminal and one of said difference amplifier input terminals, a feedback resistor connected between the other of said difference amplifier input terminals and said third output terminal; and a resistor network programmable in response to digital input signals connected between said other difference amplifier input terminal and said second output terminal.

2. The combination defined in claim 1 wherein said programmable resistor network includes a plurality of series connected resistors, the values of which are assigned according to a binary number system, and a plurality of relays each respectively having a normally closed contact pair in shunt connection with a different one of said series connected resistors, said relays being adapted for energization by said digital input signals.

3. The combination defined in claim 1 wherein said feeedback resistor includes a fixed and variable resistance connected in series thereby providing a means for precisely adjusting the predetermined maximum voltage obtainable between said first and second output terminals.

4. The combination defined in claim 1 wherein a second voltage reference is connected in series between said resistor network and said second output terminal.

5. The combination defined in claim 1 wherein said voltage reference includes a series circuit having a cold-cathode gaseous discharge tube in series with a variable resistance, and a resistance in parallel with said series circuit, said variable resistance providing a means for precisely adjusting the voltage between said first and second output terminals for zero voltage with no digital input signals applied to said programmable power supply.

6. In combination, a source of direct voltage having first and second terminals; a third output terminal; a regulating device including a vacuum tube having a plate, a cathode, and a grid; said plate being connected to said first output terminal, said cathode being connected to said third output terminal; a difference amplifier comprising a pair of vacuum tubes each having a plate, a cathode, and a grid; the cathodes of said difference amplifier being connected together and to a common terminal; said common terminal being connected to said third output terminal; a first voltage reference connected between said third output terminal and the grid of one of said difference amplifier tubes; a feedback resistor connected between the grid of the other of said difference amplifier tubes and said third output terminal; a series circuit including a group of digitally weighted series connected resistors and a second voltage reference connected between the grid of said other difference amplifier tube and said second output terminal; a group of relay each individual to a different one of the resistors of said group and each having a contact pair respectively connected to opposite sides of its associated resistor; a group of control terminal pairs, each pair of control terminals being uniquely connected to one of said relays; and an amplifier connected between the plate of one of said difference amplifier tubes and the cathode of said regulating device tube.

References Cited in the file of this patent
UNITED STATES PATENTS

| | | |
|---|---|---|
| 2,468,850 | Trucksess | May 3, 1949 |
| 2,474,269 | Martinez | June 28, 1949 |
| 2,573,405 | Clark | Oct. 30, 1951 |
| 2,762,038 | Lubkin | Sept. 4, 1956 |
| 2,784,369 | Fenemore | Mar. 5, 1957 |
| 2,808,560 | Jaffe | Oct. 1, 1957 |
| 2,841,758 | Wright et al. | July 1, 1958 |
| 2,892,147 | Bell | June 23, 1959 |